Patented Apr. 6, 1954

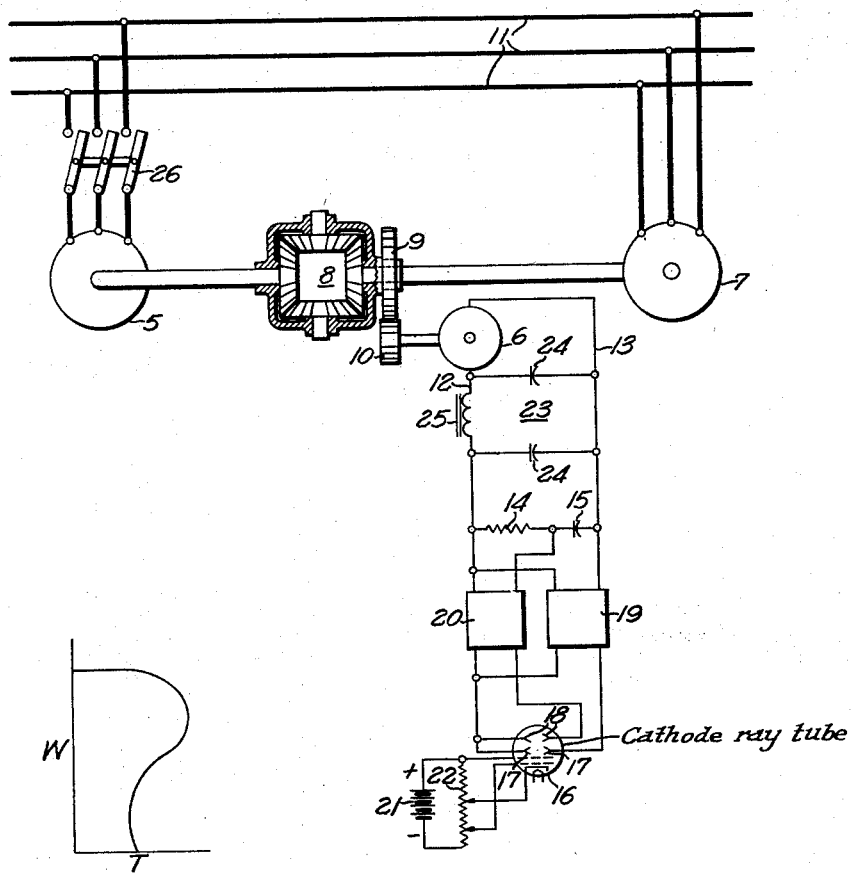

2,674,125

UNITED STATES PATENT OFFICE 2,674,125

SPEED-TORQUE CURVE TRACING DEVICE

William F. Eagan, West Allis, Wis., assignor to Allis-Chalmers Manufacturing Company, Milwaukee, Wis.

Application July 14, 1951, Serial No. 236,837

3 Claims. (Cl. 73—116)

This invention relates to a speed-torque curve tracing device of the type employing a tachometer generator driven by a machine under test.

The speed-torque curve of a machine such as an electric motor can be obtained by accelerating the motor without load from standstill at rated voltage, measuring the speed and the acceleration of the motor, and plotting the values of speed against the values of acceleration. Without external loading of the motor under test its output torque T is substantially equal to the product of the moment of inertia J and the angular acceleration $dw/dt$ of the test motor. The angular acceleration $dw/dt$ is equal to the rate of change of the angular velocity $w$ of the test motor. Therefore, the output torque of the test motor may be expressed by the formula:

$$T = J\,dw/dt$$

While during the test this torque T is substantially entirely used up to accelerate the rotor of the motor, when the motor is driving a load at constant speed substantially the entire torque T is available at the motor shaft for driving the load.

Speed-torque data relative to the motor shaft may be obtained by coupling the shaft of the test motor to a direct current tachometer generator having a capacitor of capacitance C connected across its terminals. The tachometer generator accelerates with the test motor, and generates a terminal voltage $e$ whose magnitude varies in proportion to the speed $w$ of the test motor;

$$w = (1/K)e$$

The rate of change of the tachometer terminal voltage, $de/dt$, produces a current $i$ through the capacitor which is proportional to the rate of change of the voltage times the capacitance C of the capacitor:

$$i = C\,de/dt$$

But $$dw/dt = (1/K)(de/dt)$$

therefore $$T = (J/K)(de/dt)$$
$$= (J/KC)(i)$$

which expresses that the output torque of the test motor is proportional to the rate of change of the tachometer terminal voltage and to the capacitor current. The speed-torque curve accordingly can be traced in a cathode ray tube in which the electron beam is deflected in a two coordinate system in response to the values of the terminal voltage and the capacitor current.

When the tachometer generator is coupled to the test motors so that both accelerate from standstill, the tachometer, if it is a direct current generator, produces a ripple in its commutated voltage. The ripple frequency is proportional to the generator speed times the number of commutator bars of the generator and therefore varies from zero to some maximum value. Similarly, if the tachometer is an alternating current generator with its output rectified, a ripple remains in the rectified voltage which also varies in frequency from zero to some maximum value. Such ripple in the output voltage is greatly exaggerated by the voltage differentiating circuit and therefore should be eliminated or blocked therefrom in order to obtain a good trace of the speed-torque characteristic on the cathode ray tube screen.

The disturbing effect on the cathode ray tube of the ripple in the output voltage may be eliminated by inserting a wave filter in the output circuit of the tachometer generator. A conventional wave filter of the low pass type is practical to use for blocking voltage ripple whose frequency is above the cutoff frequency of the filter. In this arrangement, however, at low speeds of the tachometer generator the ripple in the output voltage cannot be filtered out because a filter to block the low frequency voltage ripple would be of very large size and of prohibitive cost so that such a filter would be impractical to use.

To obviate such difficulty, in the present invention the tachometer generator is operated at a speed having a predetermined fixed component and a variable component proportional to the test motor speed so that a low pass wave filter is effective in blocking the tachometer ripple for all speeds of the test motor.

It is therefore an object of this invention to provide an improved speed-torque curve tracing device.

Another object of the invention is to provide a speed-torque curve tracing device comprising a tachometer generator and a low pass filter which is effective for blocking tachometer ripple voltage for all speeds of a motor under test.

Another object of the invention is to provide a speed-torque curve tracing device including a tachometer generator whose ripple voltages are filtered for any speed of the motor under test.

Another object of the invention is to provide a speed-torque curve tracing device including a tachometer generator which is operated above a predetermined speed for all speeds of a motor under test.

Other objects and advantages will be apparent from the following description taken with the accompanying drawing, in which:

Fig. 1 is a schematic diagram of a speed-torque curve tracing device embodying the present invention; and Fig. 2 is a curve illustrating a speed-torque characteristic of a test motor.

Referring more particularly to the drawing, numeral 5 designates a machine such as an induction motor whose speed-torque characteristic it is desired to trace. The speed-torque curve tracing device comprises a tachometer generator 6 which may be an alternating current generator but preferably a direct current generator whose output is connected to a suitable electric circuit from which the speed-torque characteristic may be determined.

The tachometer generator 6 is connected to a constant speed motor 7 such as a synchronous or reluctance type motor which drives the tachometer generator at a predetermined constant speed when the test motor is at standstill. The reluctance or constant speed motor 7 is energized from a suitable source of electric current represented as a supply line 11. A differential gear 8 couples the constant speed motor 7 with the shaft of the test motor 5. The tachometer generator 6 is connected through suitable gears 9, 10 to the output of the differential to cause the speed of the tachometer generator to vary from the predetermined constant speed in proportion to the speed of the shaft of the test motor. The test motor and constant speed motor may operate to drive the tachometer at a speed proportional to the difference of the motor speeds, herein designated $w$ and $w_s$, respectively. Preferably, however, the test motor and constant speed motor are operated with the same direction of rotation to drive the tachometer at a speed proportional to the sum of two speeds proportional to the motor speeds or, more simply, at a speed proportional to the sum of the motor speeds. The proportionality factor may be made any suitable value such as one-half but is preferably unity, with gears 9 and 10 having a ratio of two to one, in which case, Tachometer speed $=(w+w_s)$ The output leads 12, 13 of the tachometer generator are connected to a circuit including any suitable known device for charting or tracing the variations of terminal voltage with respect to variations in the rate of change of the terminal voltage. This circuit includes differentiating means comprising a series connected resistor 14 of relatively low impedance and capacitor 15 of relatively high impedance. The voltage $e$ measured across the series connected resistor and capacitor is proportional to tachometer speed; therefore $$e = K(w+w_s)$$

and the test motor speed $$w = (1/K)e - w_s$$

The acceleration of the tachometer generator causes a rate of change in the terminal voltage given by $$de/dt = K(dw/dt)$$

The rate of change of voltage produces the current $i$ through the capacitor, $$i = C(de/dt)$$

Substituting $$i = KC(dw/dt)$$

therefore $$T = J(dw/dt) = (J/KC)(i)$$

The torque of the test motor is proportional to the capacitor current and therefore to the voltage drop in resistor 14. The tachometer voltage across series connected resistor 14 and capacitor 15 is amplified by a suitable known direct current electronic amplifier 19 and impressed on the plates 17 vertically deflecting the electron beam of a cathode ray tube 16 in proportion to the speed of the test motor plus a constant. The voltage drop in resistor 14 is also amplified by an electronic amplifier 20 and impressed on the plates 18 horizontally deflecting the electron beam in proportion to the torque of the test motor. The tube 16 may be energized and controlled from a suitable source of voltage 21 through a voltage divider 22.

With the test motor at standstill the tachometer speed is proportional to the speed $w_s$ of the constant speed motor and the frequency of the tachometer ripple is at a minimum. A low pass wave filter 23 inserted in the output circuit of the tachometer generator and having a cut off frequency at or below the minimum frequency of the ripple voltage is effective to block such ripple from the voltages of the differentiating circuit. This filter may comprise a pair of capacitors 24 connected across leads 12, 13 and a choke or reactor 25 connected in series with lead 12 between the capacitors. The design of the filter is such that ripple voltages above a predetermined frequency are shunted by filter capacitors 24 and thereby prevented from entering the differentiating circuit.

To obtain a speed-torque curve of a test motor, as illustrated in Fig. 2, the shaft of the motor is suitably coupled to the differential gear. The constant speed motor is energized to drive the tachometer generator at a constant predetermined speed. The filter 23 is so designed that above this speed the filter is effective to substantially block from the cathode ray tube the ripple voltage produced by the tachometer generator. Below this predetermined minimum tachometer generator speed, it is not necessary that the filter be effective to block the ripple voltage.

With the tachometer generator operating at the predetermined minimum speed, the cathode ray tube is energized and suitably adjusted to begin a trace. The test motor is then energized in any suitable manner, such as by connecting it to line 11 through a switch 26. The test motor preferably rotates in the same direction as the constant speed motor and is allowed to accelerate from standstill to full speed. The tachometer generator, being coupled to the test motor through the differential gear, accelerates in proportion to the acceleration of the test motor and varies its speed above the predetermined speed in proportion to the speed of the test motor. Therefore, the speed of the tachometer generator is proportional to the sum of the speeds of the test motor and the constant speed motor, and the low pass filter substantially prevents tachometer ripple voltages entering the tube circuit for all speeds of the test motor.

Although only one embodiment of the invention has been shown and described, various changes and modifications may be made therein without departing from the spirit of the invention or from the scope of the appended claims.

It is claimed and desired to secure by Letters Patent:

1. A device for tracing the speed-torque characteristic of a rotating shaft under test, said device comprising a tachometer generator, a low pass electric filter, a cathode ray tube comprising a plurality of elements for deflecting the cathode ray beam, a first means connecting one of said elements to said generator through said filter to produce a deflection responsive to the output voltage of said generator and a second means connecting another of said elements to said generator through said filter to produce another deflection responsive to the rate of change of said output voltage, means driving said generator at a predetermined speed when said shaft is at standstill, and means connecting said shaft to said generator to cause the speed of said generator to vary from said predetermined speed in proportion to the speed of said shaft so that said filter is effective to block from said elements the disturbing ripple voltage produced by said generator for all speeds of said shaft under test.

2. A device for tracing the speed-torque characteristic of a motor under test, said device comprising a tachometer generator, a low pass electric filter, a differentiating circuit, a cathode ray tube comprising a plurality of beam deflecting elements, a first means connecting one of said elements to said generator through said filter to produce a deflection responsive to the output voltage of said generator and a second means connecting another of said elements to said generator through said filter and said differentiating circuit to produce another deflection responsive to the rate of change of said output voltage, a constant speed motor for driving said generator at a predetermined minimum speed when said test motor is not operating, and a differential gear connecting said test motor and said constant speed motor to said generator to drive said generator at a speed proportional to the sum of the speeds of said test motor and of said constant speed motor so that said filter is effective to block from said differentiating circuit and from said elements the ripple voltage produced by said generator at all speeds of said test motor.

3. A device for tracing the speed-torque characteristic of a motor under test, said device comprising a tachometer generator, a low pass electric filter, a cathode ray tube comprising a plurality of beam deflecting elements, a first means connecting one of said elements to said generator through said filter to produce a deflection responsive to the output voltage of said generator and a second means connecting another of said elements through said filter to produce another deflection responsive to the rate of change of said output voltage, a constant speed motor for driving said generator at a predetermined maximum speed when said test motor is not operating, and a differential gear connecting said test motor and said constant speed motor to said generator to drive said generator at a speed proportional to the difference of the speeds of said test motor and of said constant speed motor so that said filter is effective to block from said elements the ripple voltage produced by said generator for all speeds of said test motor.

References Cited in the file of this patent

UNITED STATES PATENTS

| Number | Name | Date |
|---|---|---|
| 1,960,614 | Anderson | May 29, 1934 |
| 2,408,711 | Volz | Oct. 1, 1946 |
| 2,509,743 | Olinger | May 30, 1950 |
| 2,568,406 | Packer et al. | Sept. 18, 1951 |
| 2,637,204 | Short | May 5, 1953 |